(12) United States Patent
Clawson et al.

(10) Patent No.: US 7,022,225 B1
(45) Date of Patent: Apr. 4, 2006

(54) WATER OZONATION MIXING AND DEGASSING SYSTEM

(75) Inventors: Allen D. Clawson, Cedar City, UT (US); Ezra Phillips, Atascadero, CA (US); Frank Martin, San Luis Obispo, CA (US)

(73) Assignee: Del Industries, Inc., San Luis Obispo, CA (US)

( * ) Notice: Subject to any disclaimer, the term of this patent is extended or adjusted under 35 U.S.C. 154(b) by 0 days.

(21) Appl. No.: 10/701,163

(22) Filed: Nov. 3, 2003

Related U.S. Application Data (60) Provisional application No. 60/464,005, filed on Apr. 18, 2003.

(51) Int. Cl.
*B01D 19/00* (2006.01)
*C02F 1/78* (2006.01)

(52) U.S. Cl. .................. 210/188; 210/198.1; 210/218; 210/259; 96/155; 261/DIG. 42

(58) Field of Classification Search ............... 210/169, 210/198.1, 205, 206, 218, 252, 258, 259, 210/416.1, 416.2, 188; 96/155; 261/75, 261/76, DIG. 42
See application file for complete search history.

(56) References Cited

U.S. PATENT DOCUMENTS

| | | | |
|---|---|---|---|
| 3,198,726 A | 8/1965 | Trikilis | |
| 3,761,065 A * | 9/1973 | Rich et al. | 261/76 |
| 3,798,457 A | 3/1974 | Lowther | |
| 4,282,172 A * | 8/1981 | McKnight | 261/76 |
| 4,341,641 A * | 7/1982 | Novak | 210/760 |
| 4,352,740 A | 10/1982 | Grader et al. | |
| 4,507,253 A * | 3/1985 | Wiesmann | 261/22 |
| 4,713,220 A | 12/1987 | Huynh et al. | |
| 4,869,881 A | 9/1989 | Collins | |
| 4,874,560 A | 10/1989 | Titmas | |
| 4,966,717 A | 10/1990 | Kern | |
| 4,995,123 A | 2/1991 | Kern | |
| 5,032,292 A | 7/1991 | Conrad | |
| 5,098,415 A | 3/1992 | Levin | |
| 5,368,815 A | 11/1994 | Kasting, Jr. et al. | |
| 5,397,461 A * | 3/1995 | Augustin | 210/123 |
| 5,501,844 A | 3/1996 | Kasting, Jr. et al. | |
| 5,520,893 A | 5/1996 | Kasting, Jr. et al. | |
| 5,561,944 A | 10/1996 | Ismail et al. | |
| 5,598,316 A | 1/1997 | Kasting, Jr. | |
| 5,630,990 A | 5/1997 | Conrad et al. | |

(Continued)

FOREIGN PATENT DOCUMENTS

JP  2215333  8/1990

(Continued)

*Primary Examiner*—Fred G. Prince
(74) *Attorney, Agent, or Firm*—Stout, Uxa, Buyan & Mullins, LLP; Frank J. Uxa; Linda A. Fox (57) ABSTRACT

An apparatus and system for mixing and separating ozonated water is provided. The apparatus is especially useful as a component of a system for cycling sanitizing ozonated water to a body of water such as a pool, spa or pond. The apparatus generally includes a separating vessel including a mixing tower, preferably located substantially entirely within the separating vessel and including a diffuser element for enhancing mixing of ozonated water without increasing turbulence in the separating vessel. Preferably, the apparatus includes a seal mechanism that substantially prevents liquid water from escaping the separating vessel with vented off-gas. The invention further provides an ozone destruct assembly including a condensate collection portion, and may also include a return line for passing a treated off-gas into the body of water.

35 Claims, 7 Drawing Sheets

U.S. PATENT DOCUMENTS

| | | | |
|---|---|---|---|
| 5,665,228 A | 9/1997 | Leaverton et al. | |
| 5,697,187 A | 12/1997 | Persinger | |
| 5,709,799 A * | 1/1998 | Engelhard | 210/748 |
| 5,803,139 A | 9/1998 | Kennedy | |
| 5,816,498 A | 10/1998 | Smith et al. | |
| 5,824,243 A | 10/1998 | Contreras | |
| 5,834,031 A | 11/1998 | Martin et al. | |
| 5,865,995 A * | 2/1999 | Nelson | 210/205 |
| 5,931,990 A * | 8/1999 | Andrews | 96/163 |
| 5,951,921 A * | 9/1999 | Koganezawa et al. | 261/36.1 |
| 6,173,527 B1 | 1/2001 | Pryor | |
| 6,279,589 B1 | 8/2001 | Goodley | |
| 6,331,279 B1 | 12/2001 | Martin | |
| 6,372,148 B1 | 4/2002 | Martin et al. | |
| 6,499,671 B1 * | 12/2002 | Sands et al. | 239/172 |
| 6,511,594 B1 * | 1/2003 | Shaw | 210/120 |
| 2002/0023866 A1 * | 2/2002 | Barnes | 210/205 |

FOREIGN PATENT DOCUMENTS

| | | | |
|---|---|---|---|
| JP | 7196521 | | 8/1995 |
| WO | WO 00/51422 | * | 8/2000 |

* cited by examiner

WATER OZONATION MIXING AND DEGASSING SYSTEM

RELATED APPLICATION

This application claims the benefit of U.S. provisional application No. 60/464,005 filed on Apr. 18, 2003, which is incorporated herein in its entirety by this specific reference thereto.

The present invention generally relates to a mixing and degassing system for ozonating water and more specifically relates to an ozone/water mixing and degassing system for purifying water for residential and commercial spa/pool use.

BACKGROUND OF THE INVENTION

Commercial and residential pools and spas, for example, swimming pools, hydrotherapy spas and jetted tubs, typically include a filtration system, a circulation pump and oftentimes a heater for heating a body of water within the pool or spa. Without an effective water treatment system, bacteria and algae will grow in the body of water, presenting a health hazard to users of the pool or spa.

It is known that ozone can be an effective oxidizing and sanitizing agent for treating water in a spa or pool. Ozone gas is sometimes mixed with water to form a sanitizing treatment stream that is introduced into the body of water being sanitized. Unfortunately, conventional ozone water mixing systems are not ideal for use in forming an ozonated water treatment stream that is suitable for use with conventional pools or spas, particularly with respect to small scale applications, for example, residential pools and spas.

Conventional water sanitizing systems using ozone do not effectively mix ozone gas with the water being sanitized. Ozone which is not properly mixed with water in an ozonated water treatment stream escapes into the atmosphere. If the pool or spa is located indoors, undissolved ozone gas can build up to undesirable, unhealthful levels and adversely impact air quality. In addition, the unmixed ozone gas that escapes into the atmosphere is wasted, thereby requiring higher quantities of ozone to be introduced into a mixing stream than would otherwise be necessary if the mixing was more effective.

Spa and pool purification systems utilizing ozone have traditionally been limited in their ability to apply sanitizing concentrations of ozone due to regulatory restrictions on the amount of ozone gas that can be discharged at the pool or spa surface. Importantly, the efficiency of ozone as a sanitizing agent is limited without proper and sufficient mixing of the gas with water.

Therefore, it can be appreciated that ozonation of water for purposes of oxidation and sanitation requires efficient transfer of ozone gas, in the dissolved state, into water in the ozonated water treatment stream. Inefficient dissolution, or mass transfer, of ozone into the water results in wasted, undissolved ozone gas being released from the surface of the water. Some conventional systems exist that are designed for very efficient mass transfer (e.g., about 99% or higher) but may still produce off-gassing of high concentrations of ozone.

For these and other reasons, large scale commercial spa and pool systems using ozone for purification conventionally utilize separate, individual components to provide the necessary functions of (1) injection of ozone gas into water, (2) mixing of the ozonated water, and (3) separation and venting of undissolved gas, including ozone gas, from the ozonated water stream. These separate components are relatively bulky, complicated to interconnect, and take up significant amounts of space, which limits their practical and cost effective use to large scale commercial applications, not to consumer or residential applications. Although combination ozone injectors and mixing chambers are commercially available, they are typically too large, expensive and/or technically complicated for use on residential size pools and spas. For example, one such combination system commercially available relies upon large, serpentine pipes to provide the mixing function.

A conventional ozone/water mixing system for a hydrotherapy spa is disclosed in Leaverton et al., U.S. Pat. No. 5,665,228, the entire disclosure of which is incorporated herein by this specific reference.

Conventional ozone water treatment systems have used common water/air valves such as steam traps to collect and vent undissolved gases. These valves are not generally built of ozone compatible materials and tend to pass a fair amount of water along with the vented gases. This leads to problems with reliability and function of the degas/destruct system which is essential to the safe operation of the ozone system.

Most commercial systems utilize a degassing valve to capture and vent the undissolved gases and a destruct unit to destroy the ozone before venting the air stream. Destruct units are constructed in various ways that will be known to those of skill in the art and involved in the industry.

One common method of destroying ozone off-gas in low to medium range concentrations (less than about a few hundred ppm or up to about a few thousand ppm) is by passing the off-gas through a catalyst bed. These catalyst beds are most effective when ozone is allowed to come in direct contact with the catalyst material itself, and only if the material remains sufficiently dry. Commercial heaters are therefore sometimes employed to prevent condensation and moisture intrusion into the catalyst bed.

There remains a need for more cost effective destruct apparatus and methods for preventing water intrusion from the degas stream into the catalyst bed.

The present invention addresses these issues in a cost effective manner designed specifically for use with ozone water treatment systems but with other applications as well.

SUMMARY OF THE INVENTION

New systems, for example, apparatus for mixing ozonated water for use in purifying waters, for example in pools, spas and jetted tubs, have been discovered. The present invention provides safe and effective apparatus and systems which overcome one or more of the above-noted and other problems. The present apparatus and systems are straightforward in construction and use, are highly convenient to install and use, and are effective in purifying water for spa and pool use.

In one embodiment of the present invention, an ozone/water mixing apparatus is provided which generally comprises a separating vessel structured to contain and degas an ozone/aqueous mixture, the separating vessel including an off-gas outlet placed and structured to vent undissolved ozone gas from the separating vessel, and an ozonated water outlet placed and structured to pass the ozone/aqueous mixture from the separating vessel to an application for use.

According to one aspect of the invention, the apparatus may further comprise a mixing tower, preferably extending into the separating vessel, the mixing tower including an inlet portion structured to receive an ozone/aqueous mixture and an outlet portion structured to pass the ozone/aqueous mixture into the separating vessel.

The mixing tower inlet portion preferably includes a first inlet structured to receive an aqueous stream, for example, a water stream, and a second inlet structured to receive a gaseous stream containing ozone. The apparatus further comprises an ozone injector for example, a venturi injector, preferably located directly adjacent to, or at least partially within, the mixing tower and connected to both the first inlet and the second inlet. For example, the first inlet may comprise a pipe fitting structured to be connected to a fresh water source, and the second inlet may comprise a standard tube fitting structured to be connected to a source of ozone gas, for example an ozone generator. The ozone injector is positioned and structured to be effective in introducing ozone gas from the second inlet into the water stream through the first inlet to form an ozonated water mixture within the mixing tower.

In one particularly advantageous embodiment of the invention, the ozone injector is located substantially entirely within the mixing tower, and the mixing tower is located at least partially within the separating vessel, and more preferably is located substantially entirely within the separating vessel. The mixing tower preferably extends a sufficient distance into the separating vessel such that an outlet portion of the mixing tower is positioned within a generally central portion of the separating vessel.

Another especially advantageous feature of the invention is that many of the components of the present apparatus, for example, but not limited to, the separating vessel and the mixing tower, may be comprised of an optically clear material, in order to allow viewing of the internal components of the apparatus, thereby facilitating maintenance and troubleshooting.

Preferably, the apparatus is designed to reduce the occurrence of surface turbulence within the separating vessel. For example, the apparatus may further comprise a diffuser element connected to the outlet portion of the mixing tower. The diffuser element may be structured to be effective in directing the ozonated water mixture passed from the mixing tower in a direction generally away from an upper portion of the separating vessel. For example, the diffuser element may include spaced apart apertures, for example slots, shaped and/or positioned to direct the ozonated water mixture in a generally non-vertical direction, for example in a substantially horizontal direction, thereby diverting flow of water and bubbles away from a water/air surface within the separating vessel. The diffuser element is structured to be effective in both quieting the ozonated water surface within the separating vessel, and reducing escape of dissolved ozone gas from the ozonated water mixture.

In some embodiments of the invention, the diffuser element is further structured to be effective in enhancing the mixing of ozone bubbles with the water, thereby reducing a concentration of undissolved ozone gas in the separating vessel. For example, the diffuser element may include apertures shaped and positioned to effect a rotating flow of the ozonated water within the separating vessel as the ozonated water is passed from the mixing tower.

Preferably, the apparatus of the present invention further comprises an off-gas outlet, or degas valve, for venting undissolved gases, for example, undissolved ozone gases, from the separating vessel.

Even more preferably, the structure of the present invention provides enhanced liquid/gas separation at the off-gas outlet. For example, the apparatus may further comprise a seal mechanism designed to inhibit escape of liquid water through the off-gas outlet. More specifically, the seal mechanism may include a float arrangement or other means of controlling a level of ozonated water in the separating vessel in order to maintain a sufficient air space between the liquid in the separating vessel and the off-gas outlet. A lever mechanism, for example, a dual lever mechanism, may be provided for controlling the float arrangement and provide substantial mechanical advantage to the seal in order to create a relatively large force and a tight seal thereby substantially preventing escape of water through the off-gas outlet.

In one embodiment of the invention, the seal mechanism includes a valve seat having a seal, for example, an o-ring type seal, that is angled to provide a variable cross-sectional area as the degas valve is opened.

According to another aspect of the invention, the apparatus further comprises an ozone destruct assembly for destroying undissolved ozone gas in an off-gas stream vented from the separating vessel, for example, through the off-gas outlet. Preferably, the ozone destruct apparatus generally comprises an ozone destruct chamber for destroying ozone gas in the off-gas stream passing therethrough. In a particularly advantageous feature of the invention, the ozone destruct assembly is designed to substantially prevent liquid water from entering the destruct chamber. For example, the ozone destruct assembly may include a condensate collection chamber adjacent the ozone destruct chamber, and structured to collect condensate within the off-gas stream being passed into the ozone destruct assembly. More specifically, the condensate collection chamber may include an inlet structured to receive the off-gas stream from the separating vessel, and an outlet structured to pass the off-gas stream, with liquid water substantially removed therefrom, to the destruct chamber where ozone gas in the off-gas stream is removed from the off-gas stream.

In one more specific aspect of the invention, the ozone destruct apparatus may comprise a hydrophobic material, for example a hydrophobic membrane, disposed between the destruct chamber and the condensate collection chamber for substantially preventing liquid water from entering the destruct chamber.

Furthermore, the condensate collection chamber may include a drain element for allowing any collected condensate to drain from the condensate collection chamber. Additionally, the drain element may include a check valve, or other mechanism, operable to release the collected condensate when a predetermined condition in the collection chamber is reached. For example, the check valve may comprise a spring loaded valve that is normally closed to flow, but is structured to open and release collected condensate in response to an increase in pressure in the collection chamber. In one particular embodiment of the invention, the released condensate is directed for reuse, for example the condensate may be returned to ozone/water mixing apparatus.

A gas stream vented from the ozone destruct assembly may be vented to the atmosphere. According to another embodiment of the invention, the treated gas stream may be introduced into the body of water contained in the pool or spa or other main vessel, for example, by means of a reintroduction line connected to the body of water through an inlet in a wall of the main vessel.

Each and every feature described herein, and each and every combination of two or more of such features, is included within the scope of the present invention provided that the features included in such a combination are not mutually inconsistent.

These and other aspects of the present invention are apparent in the following detailed description and claims, particularly when considered in conjunction with the accompanying drawings in which like parts bear like reference numerals.

DETAILED DESCRIPTION

Figure 1:
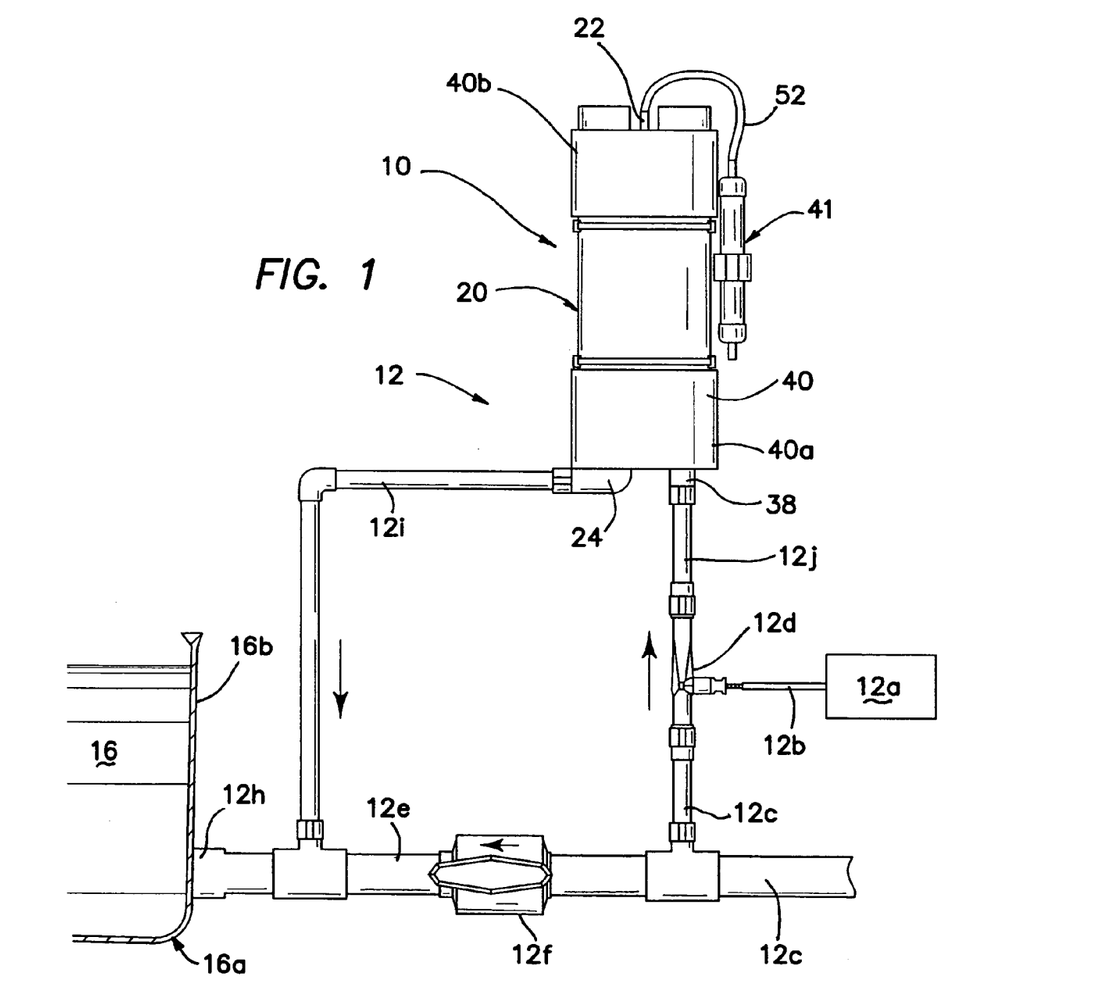
FIG. 1 shows a diagrammatical representation of an ozone/water mixing apparatus in accordance with one embodiment of the present invention, the apparatus being installed as a useful component of a plumbing system for cycling water to a spa or swimming pool.

Turning now to FIG. 1, an ozone/water mixing apparatus, in accordance with the present invention, is shown generally at 10. The apparatus 10 is shown as a very useful component of a system 12 for cycling an ozone/aqueous mixture (hereinafter sometimes referred to as "ozonated water") for use as a sanitizer and oxidizer in a body of water 16.

For purposes of example only, FIG. 1 shows the body of water 16 as being contained and circulated to a spa 16a having a spa shell 16b. It is to be appreciated that the present ozone water mixing apparatus 10 and system 12 are useful for many other applications as well, for example but not limited to, sanitation of other bodies of water, for example, water contained in a commercial or residential swimming pool, hydrotherapy spa, jetted tub or the like.

As will be discussed in detail elsewhere herein, the ozone/water mixing apparatus 10 is preferably designed for performing such functions as mixing an ozone gas into a substantially ozone-free water to form a highly concentrated ozone/aqueous mixture, separating and removing undissolved ozone-containing gas from the ozone/aqueous mixture, venting undissolved ozone-containing gas, and passing the highly concentrated, substantially degassed ozone/aqueous mixture to a body of water.

In a preferred embodiment of the invention, the apparatus 10 is designed to produce a stream of concentrated ozonated water having an ozone concentration effective in sanitizing or purifying water in a spa, jetted tub or swimming pool. For example, the apparatus 10 is preferably structured to produce an ozone/aqueous mixture having a dissolved ozone concentration of between about 1.0 ppm to about 20 ppm. It is to be appreciated that the ozone dose introduced into the body of water 16 can be adjusted as desired based on the amount of fresh water being mixed therewith, as well as other modifications to the system that will be known to those of skill in the art.

More specifically, in one embodiment of the invention, the apparatus 10 generally comprises a separating vessel 20 structured to contain and degas an ozone/aqueous mixture, wherein the separating vessel 20 includes an off-gas outlet 22 placed and structured to vent gasses, including undissolved ozone gas, from the separating vessel 20. The separating vessel further comprises an ozonated water outlet 24 placed and structured to pass the substantially degassed ozone/aqueous mixture from the separating vessel 20 to an application, (for example, spa 16a), for example, through line 26, for use as a sanitizing agent.

For example, the system 12 for cycling an ozone/aqueous mixture, in accordance with one embodiment of the invention, may include an ozone generator 12a, an ozone gas line 12b, a fresh water flow line 12c, and an ozone injector 12d.

In some embodiments of the invention, the system 12 includes a bypass line 12e for controlling a flow of fresh water to the application 16a. For example, the bypass line 12e may be equipped with a ball valve 12f and is structured and configured in a conventional manner to control pressure drop and flow of water to the separating vessel 20.

As shown, in this configuration, the ozonated water treatment stream is passed into the body of water 16 through a treatment stream inlet 12h which receives the ozone/aqueous mixture from the separating vessel 10 by means of ozonated water line 12i.

Figure 2:
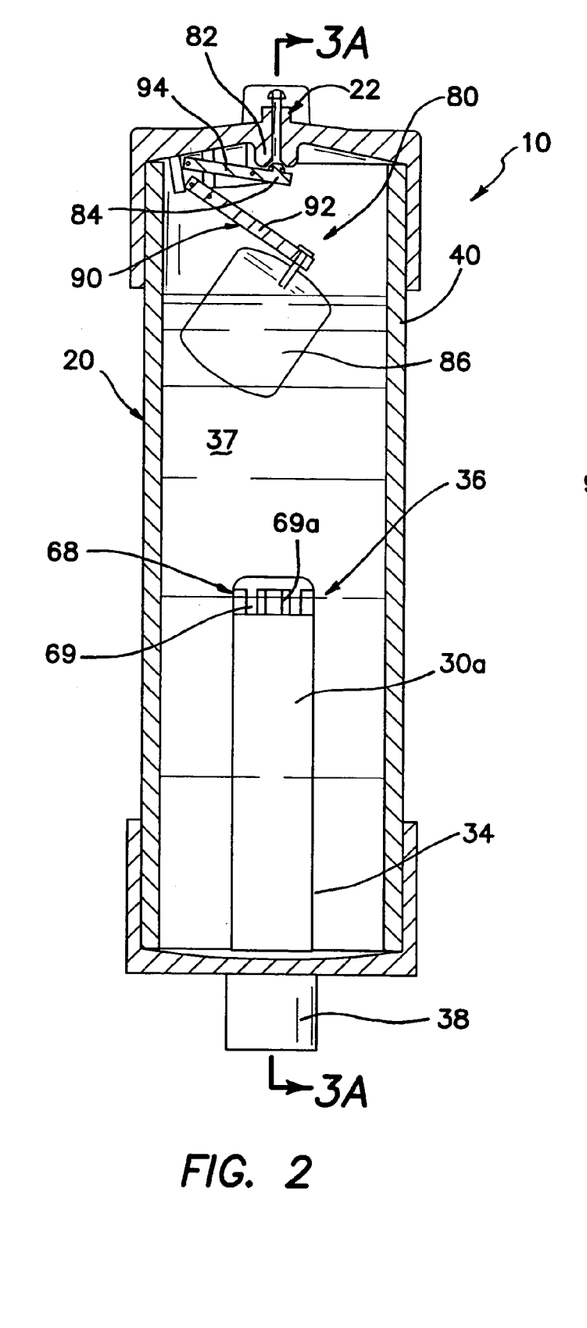
FIG. 2 shows a partial cross-sectional view of an ozone/water mixing apparatus in accordance with an embodiment of the invention, including a separating vessel, a mixing tower and a float and dual lever seal mechanism.
Figure 3A:
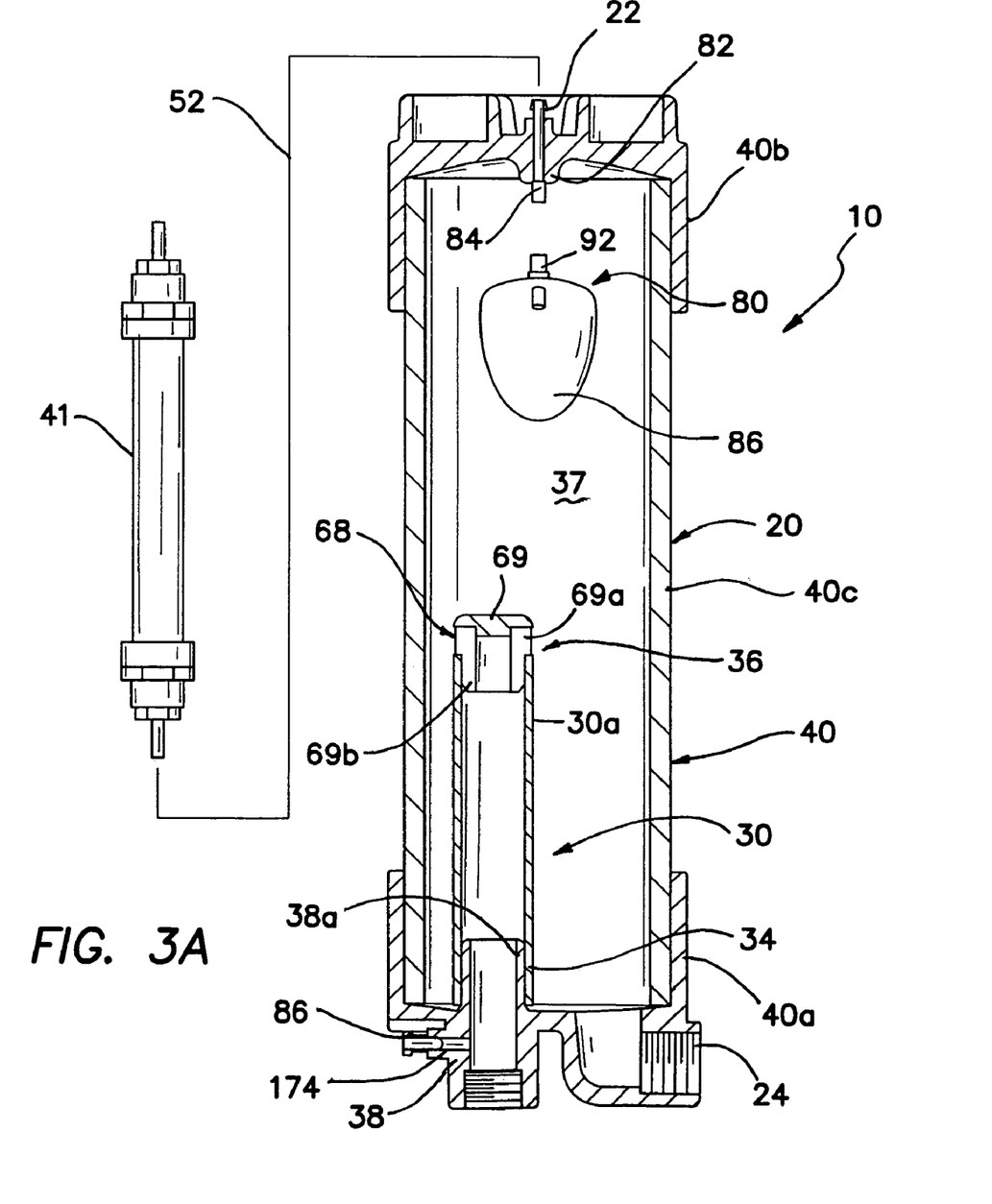
FIG. 3a shows a cross-sectional view of the apparatus of FIG. 2 taken along line 3a—3a of FIG. 2.

Turning now as well to FIGS. 2 and 3a, in a particular advantageous embodiment of the invention, the apparatus 10 further comprises a mixing tower 30 (not visible in FIG. 1) extending into the separating vessel 20, the mixing tower 30 including an inlet portion 34 structured to receive an aqueous stream, for example an ozone/aqueous stream, and an outlet portion 36 structured to pass the aqueous stream into a chamber 37 of the separating vessel 20.

The separating vessel 20 includes an inlet 38 in fluid communication with mixing tower inlet 34 for receiving the aqueous stream, for example from line 12, shown in FIG. 1 an ozonated water stream. In the embodiment shown in FIGS. 2 and 3a, inlet portion 34 of the mixing tower 30, is adequately sized to allow for a desired flow rate, for example, a flow rate of about 4 gallons per minute to about 20 gallons per minute, to pass substantially unrestricted into mixing tower 30 through the separating vessel inlet 38.

The separating vessel 20 preferably comprises a housing 40, for example a substantially cylindrical housing, including a base portion 40a, an upper portion 40b and a body portion 40c. Turning specifically to FIG. 3a, both inlet 38 and outlet 24 are molded, integral components of the housing base portion 40a. The housing base portion 40a may include an outlet. Each component of the housing 40 is preferably molded of a substantially high impact, ozone compatible material, for example PVC, PP, PC or any other suitable material. In some embodiments of the invention, the housing 40 is transparent, or optically clear, in order to allow viewing of the inner workings of the apparatus 10.

The apparatus 10 may optionally comprise an ozone destruct assembly 41 (not shown in FIG. 2) connected, for example, by means of gas line 52, to the ozone gas outlet 22. The ozone destruct assembly 41 is effective to destroy at least some of the undissolved ozone gas vented from the off-gas outlet 22.

The ozone destruct assembly 41 may be designed to utilize any of several methods of destroying ozone gas, as will be known to those of ordinary skill in the art, for example, but not limited to, the use of activated carbon, a heating element, and/or a catalytic element.

The ozonated water outlet 24 is positioned and structured to pass the ozonated water mixture from the separating vessel chamber 37 to an application for use, for example, for use as a purifying agent in a pool, spa, or jetted tub.

Preferably, the mixing tower 30 comprises an extension portion 30*a* that engages with an inlet plug 38*a* of the housing base portion 40*a*. Advantageously, the mixing tower 30 further comprises a diffuser element 68 structured to provide enhanced mixing of ozone gas with water while not significantly increasing surface turbulence in the separating vessel chamber 37. The diffuser element 68 is located and structured to be effective in directing the ozonated water mixture from the mixing tower 30 into the separating vessel chamber 37. Preferably, the mixing tower 30 is sized and structured to extend a substantial distance into the separating vessel 20, for example into a generally central region of the separating vessel 20, as shown.

The diffuser element 68 may comprise a cap portion 69 including multiple outlet ports 69*a*, and a depending portion 69*b* (not visible in FIG. 2). Extension portion 30 is located between the inlet 34 and the diffuser element 68. The extension portion 30*a* is preferably sized and structured to position the diffuser element 68 to an appropriate level for separation of gas bubbles and water.

Advantageously, the diffuser 68 is structured to be effective in directing the ozonated water mixture from the mixing tower 14 into the separating vessel 20 in a direction generally away from the ozonated water surface within the separating vessel 20, and away from the float mechanism 80. More preferably, the diffuser 68 is structured to direct the ozonated water mixture from the mixing tower 30 into the separating vessel 20 in a generally non-vertical, preferably a substantially horizontal direction.

This structure effectively functions to quiet the air/water surface and reduce turbulence within the separating vessel, thus maintaining a higher concentration of dissolved ozone in the ozone/water mixture in the chamber 37. In addition, by directing and diffusing the flow of ozonated water away from the float mechanism 80, the float mechanism 80 will be more effective in maintaining the liquid tight seal at the off-gas outlet 22 with minimal fluctuation.

Figure 2A:
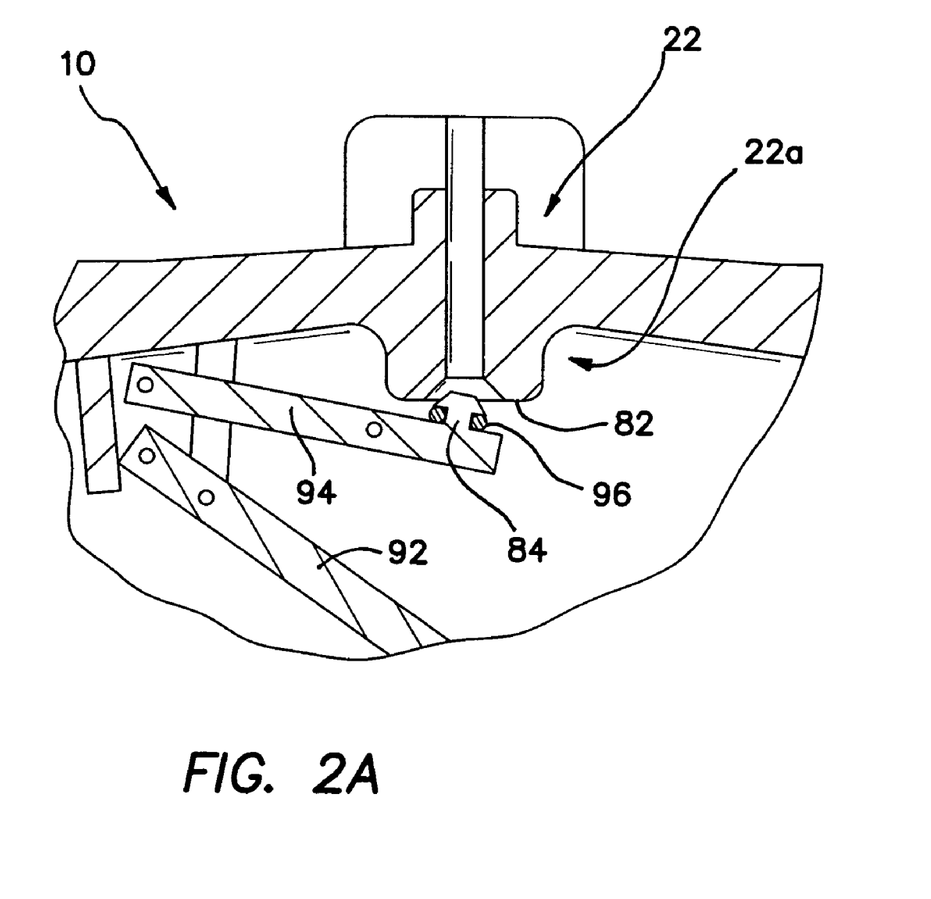
FIG. 2A shows an enlarged view of the dual lever seal mechanism shown in FIG. 2.

Turning now specifically to FIGS. 2 and 2*a*, the apparatus 10 preferably further includes a valve linkage comprised of a float mechanism 80 adapted to control a level of ozonated water in the chamber 37 of the separating vessel 20. As shown more clearly in FIG. 2*a*, the off-gas outlet 22 may include a valve 22*a*, having a seat 82 and a seal 84, structured to substantially prevent liquid water from escaping the separating vessel 40 through the off-gas outlet 22 with vented ozone off-gas.

Preferably, referring now to FIG. 2, the float mechanism 80 includes a float element 86, and multiple lever mechanism 90 comprising hinged arms 92 and 94 which function to provide a substantial mechanical advantage to the seal 84 against the seat 82. The float element 86 is sized to smoothly and precisely control the water level in the chamber 37 and provide downward force necessary to open the off-gas outlet 22 under pressure.

The valve linkage hereinabove described allows for physical separation of the valve seat 82 from an ozonated water surface in the chamber 42 thus reducing the chance of water release through the off-gas outlet 22. The linkage also provides mechanical advantage to the seal in order to create a relatively large force and tight seal. In addition, in another aspect of the invention, the seal 84 may comprise an O'ring type seal 96, the seal 84 being disposed at an angle with respect to the seat 82 as shown, thereby providing a variable cross-sectional area as the valve opens in order to allow the valve to achieve a state of equilibrium and further enhancing the water/air separation aspect of the invention.

Advantageously, the entire apparatus 10 is sized and structured to be exceptionally compact, yet highly effective in producing a sanitizing stream of ozonated water for use in a spa or pool. For example, in one embodiment of the invention, the apparatus, including the mixing tower 30 and separating vessel 20, has a maximum dimension of no greater than about 16 inches and a diameter of no greater than about 5 inches. This particular embodiment is structured and designed to fit, or be substantially hidden, within a small area beneath a jetted spa rim. In another embodiment of the invention designed for swimming pool use, the apparatus 10 is no greater than about 18 inches in height.

Figure 3B:
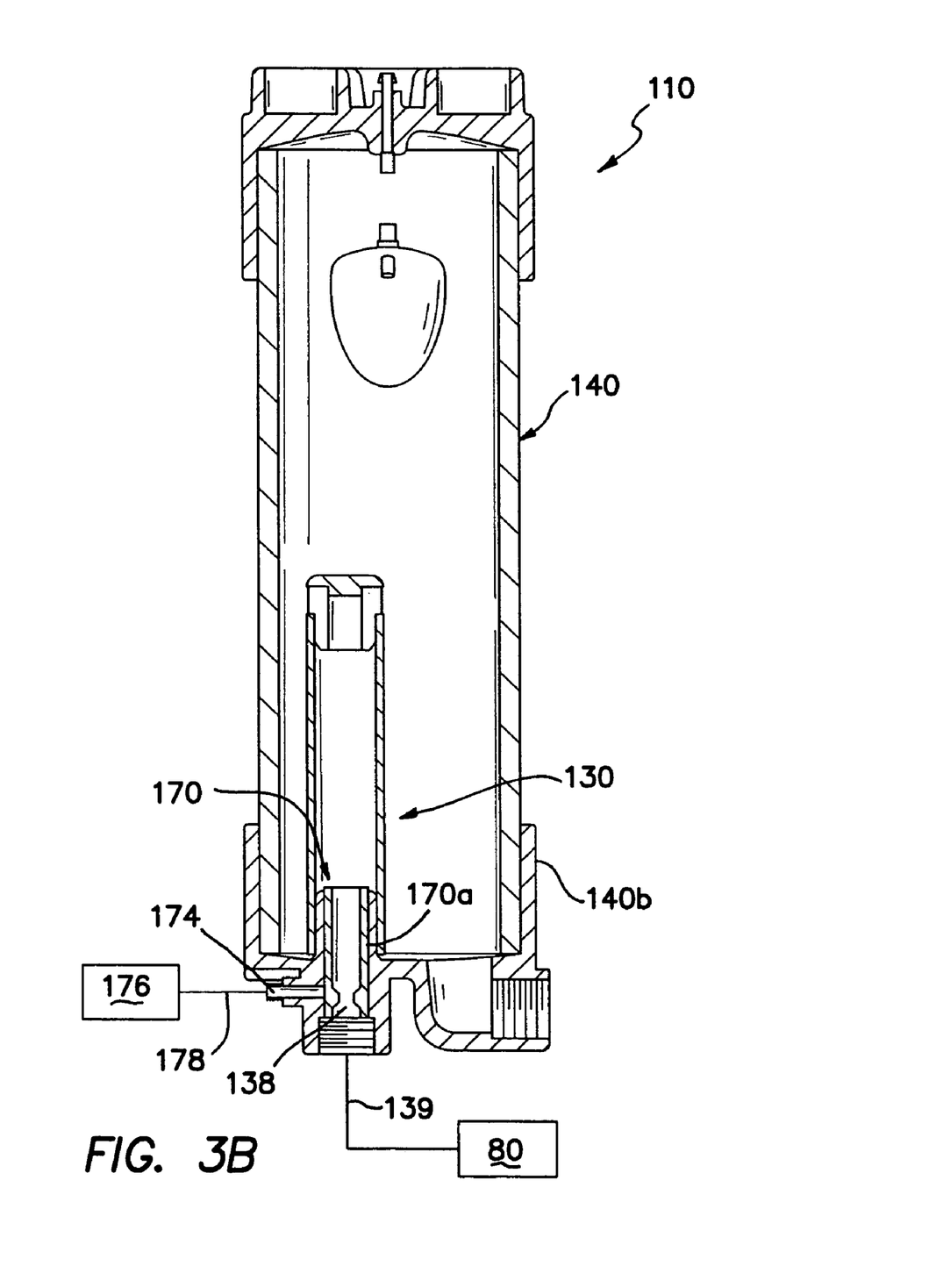
FIG. 3b shows a cross-sectional view of an ozone/water mixing apparatus in accordance with another embodiment of the invention, including an additional feature of ozone injector located substantially entirely within the mixing tower.

Turning now to FIG. 3*b*, another embodiment of the invention, similar to the embodiment shown in FIG. 3*a*, is shown generally at 110. Except as expressly described herein, apparatus 110 is similar to apparatus 10 and features of apparatus 110 which correspond to features of apparatus 10 are designated by the corresponding reference numerals increased by 100.

With reference to FIG. 3*b*, the major difference between apparatus 10 and apparatus 110 relates to an ozone injector 170 located at least partially, and preferably substantially entirely within the mixing tower 130. As shown, the ozone injector 170 may be in the form of a molded insert element 170*a* that is at least partially located within the base portion 140*b* of the separating vessel housing 140 and the mixing tower 130. Preferably, the insert element 170*a* is sized and molded to be fitted substantially entirely within the base portion 140*a* of the housing 140.

For example, the ozone injector insert element 170*a* may comprise a venturi-type ozone injector which draws ozone gas through an ozone gas inlet 174 that is connected to a source of ozone-containing gas, for example, an ozone generator 176, for example by line 178.

The ozone injector 170 is structured to be effective in introducing ozone gas from the ozone gas inlet 174 into a water stream passing through water inlet 138 to form an ozonated water mixture within the mixing tower 130. This option is most useful in relatively small scale applications, for example, spa or hot tub applications.

For example, for applications such as cycling ozonated water to a residential spa or other relatively small scale application, water inlet 138 is connected by line 139 to a source of fresh water 80 (e.g., substantially ozone-free water) that is being cycled to the spa. Ozone gas is drawn into ozone gas inlet 174 by the venturi effect of ozone injector 170 and is combined with fresh water passed through water inlet 138.

The ozone gas inlet 174 preferably comprises an ozone gas compatible tube having a diameter of between about ¼ inch and about ½ inch. The ozone gas inlet 174 may include a barb feature or other standard tube fitting, and a check valve (not shown) to substantially prevent water back flow into the ozone generator 176.

Referring briefly back to FIG. 3*a*, it is noted that apparatus 10 may be substantially identical to apparatus 110 in structure, wherein apparatus 10 is the same structure as apparatus 110 with the ozone injector insert element 170*a* removed therefrom. Thus, in some embodiments of the invention, the ozone injector 170 is designed to be removable from the apparatus 110. In this case, inlet 38 is connected to a source of ozonated water, for example the source of ozonated water being formed at a location outside of, or external to, the apparatus 10 and ozone gas inlet 74 may be fitted with a plug 86 or otherwise sealed as shown in FIG. 3*a*.

Turning back to FIG. 3*b*, the ozone generator 176 preferably comprises an ozone generating apparatus such as disclosed in Martin, et al, U.S. Pat. No. 6,331,279 or Martin et al, U.S. Pat. No. 6,372,148 B1, the disclosure of each of which is being incorporated herein in its entirety by this specific reference. The ozone generator 176 preferably is a generator suitable for producing an ozone enriched gaseous stream having an ozone concentration of at least about 200 ppm and up to about 3000 ppm.

Advantageously, the ozone injector 170 is structured and placed to be effective to provide the majority of the ozone/water mixing function of the apparatus 110. The ozone injector 170 is structured to pull ozone into the water stream by vacuum, or suction, created by the venturi effect of the injector 170, as known to those of skill in the art.

As shown in FIG. 3*b*, the ozone injector 170 preferably is structured to fit within a lower portion of the mixing tower 130 and is further structured to be directly connected to water inlet 138 such that ozone gas is injected into the water flow within the confines of the apparatus housing 140. Thus, it can be appreciated that the present apparatus 110 can be made to be exceptionally compact and does not require additional conduits and/or separate fittings between the site of water injection and the site of ozone gas injection, for example, such as are typically required in conventional apparatus.

The present invention provides highly compact, durable and convenient ozone water mixing and separating apparatus 10 and 110 that are effective to produce highly concentrated ozonated water mixtures for use as a purifying/sanitizing component. Moreover, the apparatus 10, 110 of the present invention are reliable and require little or no maintenance.

Figure 4:
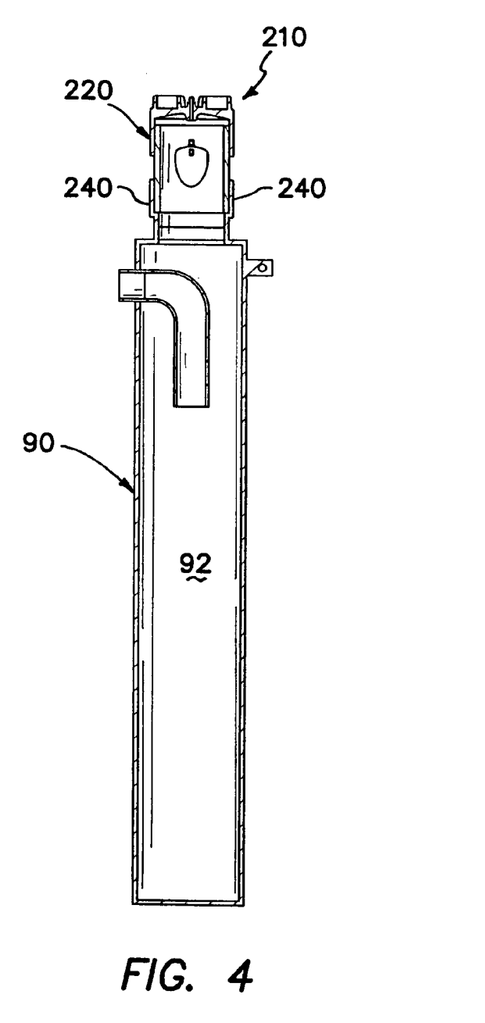
FIG. 4 shows a cross-sectional view of an ozone/water mixing apparatus in accordance with yet another embodiment of the present invention, wherein the apparatus is adapted and structured to be installed to a contact tank.

FIG. 4 shows yet another apparatus 210 in accordance with the present invention. Except as expressly described herein, apparatus 210 is similar to apparatus 10 and features of apparatus 210 which correspond to features of apparatus 10 are designated by the corresponding reference numerals increased by 200.

Referring to FIG. 4, apparatus 210 is structured to be useful for degassing ozonated water within a contact tank or reaction vessel 90 that is used for mixing and/or storing ozonated water within a stainless steel reservoir 92 for example. As shown, apparatus 210 preferably includes separation vessel housing 240 having alternative base portion 240*c* that is structured to be connected to an upper portion of the contact tank or reaction vessel 90 such that gases within contact tank reservoir 92 are passed directly into separating vessel 220 for degassing.

Figure 5:
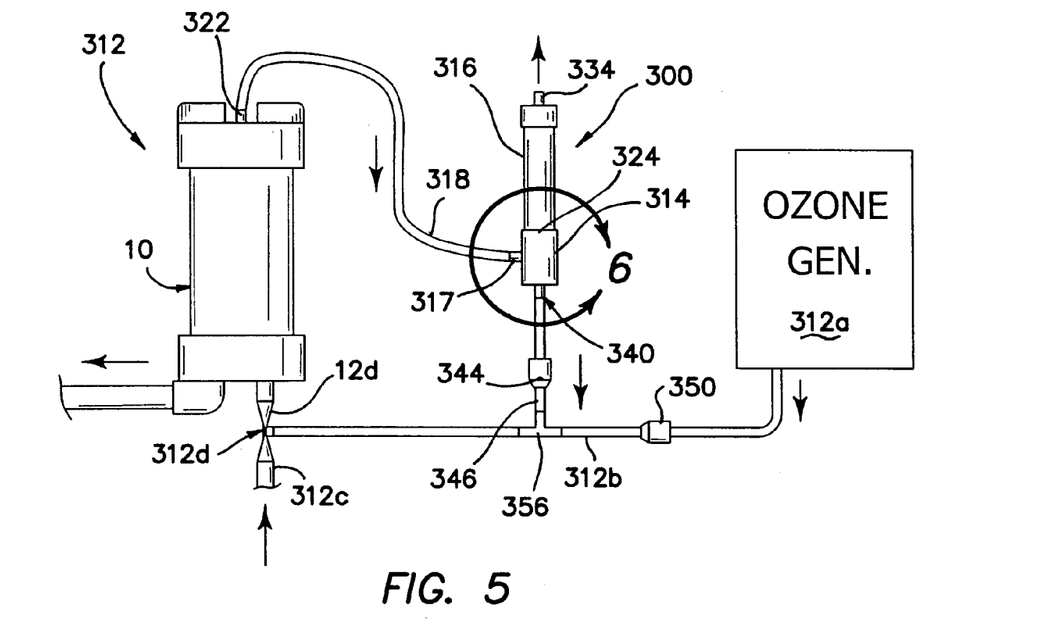
FIG. 5 shows a schematic representation of a water ozonation system in accordance with another embodiment of the present invention, the system including a preferred ozone destruct apparatus.

Turning now to the FIG. 5, a preferred ozone destruct apparatus, in accordance with another embodiment of the invention, is shown generally at 300. The ozone destruct apparatus 300 is shown as a useful component of a water ozonation system 312 for ozonating water being cycled to a pool, spa, pond, or other body of water to be sanitized. Except as expressly described herein, system 312 is similar to system 12 and features of system 312 which correspond to features of system 12 are designated by the corresponding reference numerals increased by 300.

It is to be appreciated that the preferred ozone destruct assembly 300 shown in FIG. 5 may be used in place of the conventional ozone destruct cartridge 41 shown in FIG. 1.

It should also be appreciated that although ozone destruct assembly 300 is shown as being used with the ozone/water mixing and separating apparatus 10 of the present invention, the ozone destruct assembly 300 can be used as a useful component of any system that requires removal of ozone gases from an off-gas stream.

For example, the system 312 may include, but is not limited to include, an ozone generator 312*a*, an ozone gas line 312*b*, a fresh water flow line 312*c*, an ozone injector 312*d*, and ozone/water mixing and separating apparatus 10 (or, alternatively, with appropriate modification, apparatus 110) having off-gas outlet 322.

Figure 6:
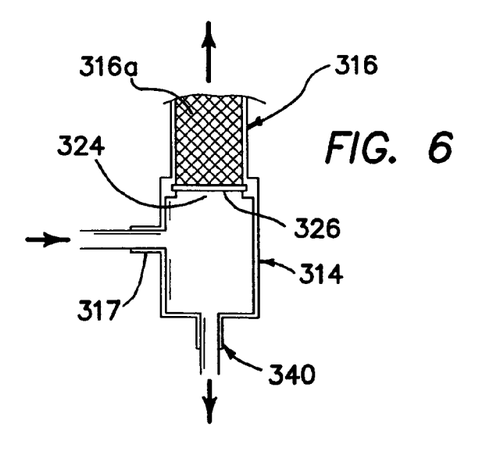
FIG. 6 shows an enlarged view, in cross-section, of a portion of the ozone destruct apparatus shown in FIG. 5 taken along line 6 of FIG. 5.

Referring now to FIGS. 5 and 6, the ozone destruct apparatus 300 in accordance with the present invention generally comprises a condensate collection chamber 314 and a destruct chamber 316 connected thereto.

In an especially advantageous embodiment of the invention, the destruct chamber 316 is structured to be effective in destroying undissolved ozone that may be present in an off-gas stream. For example, the destruct chamber 316 may include a catalyst bed 316*a* comprising a material that is effective in destroying ozone gas passed therethrough. For example, the catalyst bed 316*a* may comprise, for example, activated carbon in the form of a granular activated carbon cartridge (a "GAC" cartridge) such as is commonly used for destroying ozone present in air. The catalyst material may alternatively or additionally comprise a manganese dioxide catalyst (such as is commonly used with oxygen-fed ozone systems), or other suitable material effective in destroying ozone gas, such materials being well known to those of skill in the art.

It will be appreciated that various components of the apparatus 300 including the destruct chamber 316, the catalyst bed 316*a*, and the condensation collection chamber 314, may be sized per individual system requirements.

The condensate collection chamber 314 includes an inlet 317 for receiving a stream of gas, for example, an off-gas stream containing ozone, for example from line 318 in FIG. 5. The condensate collection chamber 314 is structured to collect liquid water, for example in the form of condensate. As shown, the condensate collection chamber 314 is in communication with the destruct chamber 316 at interfacing portion 324 (also referred to herein as "collection chamber outlet 324"). The off-gas stream, having liquid water substantially removed therefrom, is discharged to the destruct chamber 316 through the collection chamber outlet 324.

Preferably, the apparatus 300 further comprises a moisture barrier, for example a material that is porous to air but is impenetrable by liquid water. For example, the moisture barrier comprises a hydrophobic material 326, for example a commercially available hydrophobic membrane, disposed across the collection chamber outlet 324.

Advantageously, the design of the apparatus 300 is effective to substantially prevent liquid water from entering the destruct chamber 316 which would thereby cause the destruct chamber catalyst to become less effective, or even ineffective, in destroying ozone gas. As shown in FIG. 6, the hydrophobic material 326 is preferably secured and fitted across the collection chamber outlet 324 in a manner such that all gases passing into the destruct chamber 316 must initially pass through the hydrophobic material 326.

In the example shown in the FIGS. 5 and 6, system 312 is designed for cycling ozonated water to a heated spa, with off-gas from apparatus 10 being vented from degas valve 32 into line 318. In such a configuration, the off-gas stream from the apparatus 10 likely contains undissolved ozone gas, and moisture, often simply in the form of condensate, that forms in the tubing of line 118. Water droplets in the off-gas stream enter the apparatus 300 at port inlet 317 but are trapped in the collection chamber 314 below the hydrophobic material 326. In this manner, liquid water is substantially prevented from entering destruct chamber 316 along with the off-gas. After passing through destruct chamber 316, the off-gas having ozone substantially removed therefrom is vented from the destruct chamber 316 through an outlet 334.

Preferably, the condensate collection chamber 314 further includes a drain element 340 for allowing collected condensate to drain and to be released from the collection chamber 314.

In one especially advantageous aspect of the invention, the drain element 340 includes a check valve 344, for example a spring loaded check valve oriented in the draining flow direction. The check valve 344 is positioned and structured to be operable in releasing collected condensate from the collection chamber 314 when a predetermined condition is reached. For example, the check valve 344 is positioned and structured to allow at least some of the collected condensate to drain through drain element 340 when a predetermined pressure is exerted against the check valve 344.

In a more specific aspect of the invention, the drain element 340 and check valve 344 are structured to allow drainage of condensate when a certain volume of trapped water in the collection chamber 314 is reached. The valve 144 may be designed to open in response to a minimal opening pressure exerted against the valve 344.

In another more specific aspect of the invention, the apparatus 300 is designed such that when collected condensate reaches a level in which water completely blocks the airflow through inlet 317, pressure is transferred to collection chamber 314 from other parts of the system 312, for example pressure from apparatus 10 or degas valve 32, thereby causing check valve 344 to momentarily open and release of a small quantity of water through drain element 340.

Advantageously, in this manner a steady state condition is developed wherein each drop of water entering the apparatus 300 causes another drop of water to be expelled, ultimately keeping the catalyst bed 316a free of liquid moisture.

In another aspect of the invention, the collection chamber drain element 340 may be structured so that draining water is re-introduced back into the system 312. Beneficially, the drain element 440 may be positioned and structured to be fitted to a low pressure point in the ozone-water system 312, allowing the expelled moisture from collection chamber 314 to be re-introduced.

For example, referring now to FIG. 5, in a possible configuration of the system 312 fitted with apparatus 300, preferable for small system use such as a spa, the drain element 340 is connected to a moisture drain line 346. Drain line 346 may be is fitted to a venturi in order to draw collected condensate from the collection chamber 314. For example, the venturi may be the venturi of the ozone injector 112d which supplies suction for an ozone generator 112a. By appropriately sizing the spring force of the check valve 344 relatively higher than an upstream check valve, for example, spring loaded check valve 350 (hereinafter "ozone check valve 50") in ozone line 312b, the system 312 may be balanced to provide suction to the ozone generator 312a for introduction of ozone into the water while allowing momentary expulsion of moisture from the drain element 340. This is accomplished, for example, by placing a Tee fitting 356 in the ozone line 312b between ozone check valve 350, and the suction port of venturi injector 312d. The drain tubing 346 from the drain valve 344 (of somewhat higher opening force than the ozone check valve 350) is then fitted to this Tee fitting 356 as shown.

Figure 7:
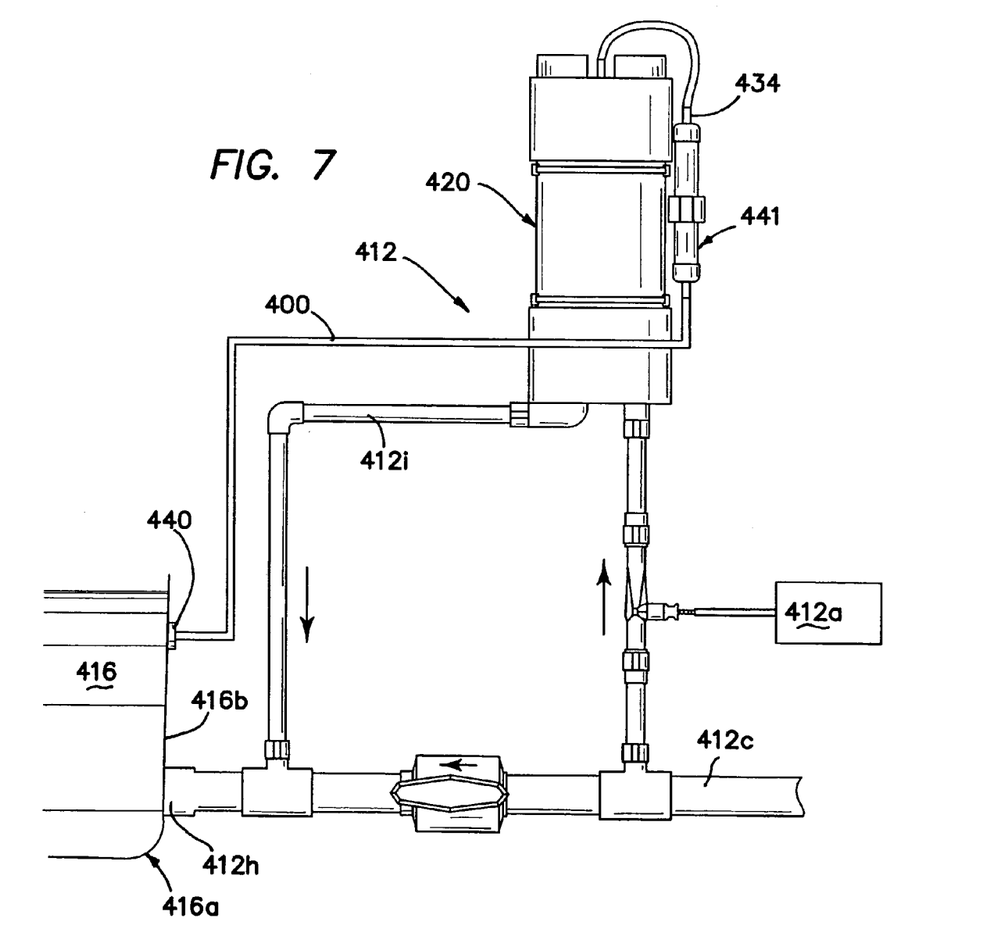
FIG. 7 shows a diagrammatical representation of an ozone/water mixing apparatus in accordance with the present invention including a reintroduction line for introducing a stream of substantially ozone free gas from the ozone destruct apparatus and into the body of water being treated.

FIG. 7 shows yet another feature of the present invention. FIG. 7 shows an ozonated water system 412, in accordance with the present invention, useful for providing for example, a sanitizing ozonated water stream to a body of water 416 in a pool or spa 416a. This system 412 is substantially similar to system 12 shown in FIG. 12, and includes, for example ozone generator 412a, fresh water line 412c, separation vessel 420, ozone destruct assembly 441 and ozonated water line 412i, with the major difference being the addition of a substantially ozone-free off-gas line 400 positioned and structured for directing substantially ozone-free gas vented from an outlet 435 of the ozone destruct assembly 441 (or alternatively, ozone destruct assembly 300) into the body of water 416 being sanitized.

Vented gas from ozone destruct outlet 435 may contain nitrogen, oxygen, trace amounts of ozone and moisture. Rather than venting this treated "off-gas" into the atmosphere, this gas is pushed into the body of water 416, for example through an inlet 440 preferably separate from ozonated water inlet 412h, in the spa wall 416b. Advantageously, this may be accomplished by means of pressures already present in the system 412, without therefore, the use of any additional pumps or injectors to cause the gas to be pushed into the body of water 416.

It is noted that all materials in the construction of the present invention are resistant to ozone, chemicals and salts typically found in pool, spa, aquaculture, aquatic life support, agricultural and other waters.

While this invention has been described with respect to various specific examples and embodiments, it is to be understood that the invention is not limited thereto and that it can be variously practiced within the scope of the following claims.

What is claimed is:

1. An ozone/water mixing apparatus comprising:
   a separating vessel structured to contain and degas an ozone/aqueous mixture, the separating vessel including
      an off-gas outlet placed and structured to vent undissolved ozone gas from the separating vessel, and
      an ozonated water outlet placed and structured to pass the ozone/aqueous mixture from the separating vessel to an application for use; and
   a mixing tower, extending into the separating vessel, the mixing tower including
      an inlet portion structured to receive an ozone/aqueous stream, the inlet portion including a first inlet structured to receive an aqueous stream and a second inlet structured to receive a gaseous stream containing ozone, and an ozone injector connected to the first inlet and the second inlet, and
      an outlet portion structured to pass the ozone/aqueous mixture into the separating vessel.

2. The apparatus of claim 1 wherein the ozone injector comprises an insert element being at least partially located within the mixing tower.

3. The apparatus of claim 1 wherein the mixing tower outlet portion is located within a generally central portion of the separating vessel.

4. The apparatus of claim 1 wherein the mixing tower outlet portion comprises a diffuser element.

5. The apparatus of claim 4 wherein the diffuser element is structured to be effective in reducing surface turbulence in the separating vessel.

6. The apparatus of claim 4 wherein the diffuser element is structured to enhance mixing of the ozone/aqueous mixture passing therethrough.

7. The apparatus of claim 4 wherein the diffuser element includes a plurality of spaced apart, radially disposed apertures for passing the ozone/aqueous mixture from the mixing tower into the separating vessel.

8. The apparatus of claim 1 further comprising a seal mechanism disposed within the separating vessel and structured to substantially prevent liquid water from escaping the off-gas outlet with vented undissolved ozone gas.

9. The apparatus of claim 8 wherein the seal mechanism comprises a float arrangement structured to be effective to control a level of ozonated water in the separating vessel.

10. The apparatus of claim 8 wherein the seal mechanism includes a seal element structured to seal the off-gas outlet, a float arrangement structured to be effective to control a level of ozonated water in the separating vessel, and a dual lever mechanism connecting the float element with the seal element.

11. The apparatus of claim 10 wherein the seal element comprises an O-ring.

12. The apparatus of claim 10 wherein the dual lever mechanism is structured to provide a substantial mechanical advantage to the seal mechanism.

13. The apparatus of claim 1 further comprising an ozone destruct assembly connected to the off-gas outlet.

14. An ozone/water mixing apparatus comprising:
a separating vessel structured to contain and degas an ozone/aqueous mixture, the separating vessel including
an off-gas outlet placed and structured to vent undissolved ozone gas from the separating vessel, and
an ozonated water outlet placed and structured to pass the ozone/aqueous mixture from the separating vessel to an application for use; and
a mixing tower, extending into the separating vessel, the mixing tower including
an inlet portion structured to receive an ozone/aqueous stream, and
an outlet portion comprising a diffuser element structured to pass the ozone/aqueous mixture into the separating vessel and effective in reducing surface turbulence in the separating vessel.

15. The apparatus of claim 14 further comprising a seal mechanism including a float arrangement structured to be effective to control a level of ozonated water in the separating vessel.

16. The apparatus of claim 15 wherein the seal mechanism further includes a seal element structured to seal the off-gas outlet, and a dual lever mechanism connecting the float element with the seal element.

17. The apparatus of claim 16 wherein the dual lever mechanism is structured to provide a substantial mechanical advantage to the seal mechanism.

18. The apparatus of claim 14 further comprising an ozone destruct assembly connected to the off-gas outlet.

19. The apparatus of claim 14 wherein the separating vessel includes a portion structured to enable the apparatus to be directly connected to a contact tank.

20. The apparatus of claim 14 wherein the separating vessel includes an upper portion and a lower portion, the upper portion including the off-gas outlet and the lower portion being structured to enable the apparatus to be directly connected to a contact tank.

21. The apparatus of claim 14 further comprising an ozone destruct assembly connected to the off-gas outlet.

22. An ozone destruct apparatus comprising:
an ozone destruct chamber connected to a line for containing an off-gas stream, the ozone destruct chamber being effective in destroying ozone in the off-gas stream as the stream is passed through the ozone destruct chamber; and
a condensate collection chamber structured to collect condensate within the stream of off-gas, the condensate collection chamber including an inlet for receiving the off-gas stream, and an outlet for discharging the off-gas stream to the destruct chamber.

23. The apparatus of claim 22 further comprising a hydrophobic material disposed between the destruct chamber and the condensate collection chamber for substantially preventing liquid water from entering the destruct chamber.

24. The apparatus of claim 22 wherein the condensate collection chamber further includes a drain element for allowing collected condensate to drain from the collection chamber.

25. The apparatus of claim 22 wherein the condensate collection chamber further includes a drain element for allowing collected condensate to drain from the collection chamber to an application for use of the condensate.

26. The apparatus of claim 25 wherein the drain element includes a check valve operable to release the collected condensate when a predetermined condition in the collection chamber is reached.

27. The apparatus of claim 22 wherein the ozone destruct chamber includes a catalyst material effective in destroying ozone.

28. The apparatus of claim 27 wherein the catalyst material comprises activated carbon.

29. The apparatus of claim 27 wherein the catalyst material comprises manganese dioxide.

30. An ozone/water mixing system comprising:
a separating vessel structured to contain and degas an ozone/aqueous mixture, the separating vessel including
an off-gas outlet placed and structured to vent undissolved ozone gas from the separating vessel, and
an ozonated water outlet placed and structured to pass the ozone/aqueous mixture from the separating vessel to an application for use;
a mixing tower, extending into the separating vessel, the mixing tower including
an inlet portion structured to receive an ozone/aqueous stream, and
an outlet portion structured to pass the ozone/aqueous mixture into the separating vessel;
an ozone destruct chamber structured to be effective in destroying ozone in the off-gas stream as an ozone-containing off-gas stream is passed through the ozone destruct chamber; and
a condensate collection chamber structured to collect condensate within an ozone containing off-gas stream, the condensate collection chamber including an inlet connected to the separating vessel off-gas outlet and an outlet for discharging the off-gas stream to the destruct chamber.

31. A system for providing an ozonated water stream to a body of water, the system comprising:

a separating vessel structured to contain and degas an ozone/aqueous mixture, the separating vessel including
an inlet for receiving an ozone/aqueous mixture into the separating vessel,
an off-gas outlet placed and structured to vent an ozone containing off-gas stream from the separating vessel, and
an ozonated water outlet placed and structured to pass the ozone/aqueous mixture from the separating vessel to a main vessel containing a body of water to be treated;
an ozone destruct chamber structured to be effective in destroying at least a portion of the ozone in the ozone containing off-gas stream as the ozone containing off-gas stream is passed through the ozone destruct chamber; and
a return line connected to the ozone destruct chamber and placed and structured to pass the off-gas stream from the ozone destruct chamber and into the main vessel containing the body of water.

32. An ozone/water mixing apparatus comprising:
a separating vessel structured to contain and degas an ozone/aqueous mixture, the separating vessel including
an off-gas outlet placed and structured to vent undissolved ozone gas from the separating vessel, and
an ozonated water outlet placed and structured to pass the ozone/aqueous mixture from the separating vessel to an application for use; and
a mixing tower, extending into the separating vessel, the mixing tower including
an inlet portion structured to receive an ozone/aqueous stream, and
an outlet portion comprising a diffuser element including a plurality of radially disposed apertures for passing the ozone/aqueous mixture from the mixing tower and into the separating vessel.

33. The apparatus of claim 14 wherein the mixing tower further includes an elongated extension portion extending between the inlet portion and the outlet portion.

34. An ozone/water mixing system comprising:
a separating vessel structured to contain and degas an ozone/aqueous mixture, the separating vessel including
an off-gas outlet placed and structured to vent undissolved ozone gas from the separating vessel, and
an ozonated water outlet placed and structured to pass an ozone/aqueous mixture from the separating vessel to an application for use;
a venturi injector assembly operatively coupled to the separating vessel and structured to inject an ozone-containing gaseous stream, without passing into contact with the ozone/aqueous mixture in the separating vessel, directly into an aqueous stream to form the ozone/aqueous mixture; and
a mixing tower extending into the separating vessel and including an inlet portion structured to receive the ozone/aqueous mixture from the venturi injector assembly, and an outlet portion structured to pass the ozone/aqueous mixture into the separating vessel.

35. The system of claim 34 wherein the venturi injector assembly comprises an insert positioned within the inlet portion of the mixing tower.

* * * * *